3,099,613
RADIOLYTIC OXIDATION OF HYDROCARBONS
William Bartok, Cranford, and Peter J. Lucchesi, Plainfield, N.J., assignors to Esso Research and Engineering Company, a corporation of Delaware
No Drawing. Filed Dec. 21, 1959, Ser. No. 860,723
6 Claims. (Cl. 204—162)

The present invention relates to the radiolytic oxidation of hydrocarbons. Specifically, it concerns the radiolytic partial oxidation of $C_5$ to $C_{15}$ hydrocarbons at elevated temperatures with molecular oxygen.

It is known that hydrocarbons, especially paraffins, can be noncatalytically oxidized in the vapor phase at temperature above 260° C. The oxidation is an essentially homogeneous chain reaction which, after initiation, proceeds quite rapidly and frequently gives rise to a phenomenon known as a "cool flame." The rapid oxidation usually occurs in a part of the reactor thus causing one region of the reactor to become undesirably hot. This results in loss in selectivity and sometimes in complete conversion of the hydrocarbon feed to water and carbon oxides.

An object of the present invention is to provide a process in which only moderately high temperatures, i.e. below 235° C., are employed to prevent conversion of the feed to inorganic products. Another object is to provide a method for initiating partial oxidation reactions with nuclear radiation to prepare epoxides useful as chemicals and fuel blending components.

In accordance with the present invention hydrocarbons are partially oxidized at moderately high temperatures with molecular oxygen by utilizing ionizing energy to initiate the reaction. The radiolytic partial oxidation of hydrocarbon feeds is controlled by adjusting the temperature, pressure and radiation intensity according to the degree of oxidation desired.

It has been discovered that intermediate molecular weight hydrocarbons, such as those present in many petroleum streams, can be partially oxidized at temperatures above 120° C. but below 235° C. The oxidation temperature for the chain reaction is highly critical if decomposition is to be avoided. For instance, the temperature must be sufficiently high to permit efficient chain initiation, but yet not high enough to support branched chain reactions which ultimately result in the formation of carbon oxides and water. The conditions must be balanced so that controlled chain reaction occurs and the intermediate oxidation products, such as epoxides, ethers and alcohols are primarily formed. The use of nuclear radiation to initiate the chain reactions is highly desirable because it permits the employment of oxidation temperatures in the range of 120 to 230° C. which are sufficiently low to substantially avoid degradation of the feed to its final oxidation products.

The process may be carried out either in a continuous manner or batchwise. In the formed method, the unreacted feed is continually separated from the reaction products and recycled to the reaction zone wherein it can be resubjected to oxidation. Since the hydrocarbon feed usually has a carbon number of 5 or more, the reaction product will comprise mainly liquids which are generally epoxides or cyclic ethers of the corresponding hydrocarbon in the feed.

In carrying out the present invention, a suitable reactor, e.g. a stainless steel vessel, is charged with relative proportions of 0.5 to 5 moles of hydrocarbon feed and 1 mole of oxygen, which may be either pure oxygen gas or air. The pressure in the reactor, which can be adjusted by regulating the amount of reactants introduced into the reactor, may vary from as little as 10 mm. of mercury absolute pressure to 30 atmospheres or more. For most purposes, it will be found that pressures of 500 mm. to 20 atmospheres are satisfactory. The radiolytic partial oxidation of the hydrocarbon feed is preferably carried out in the vapor phase rather than the liquid phase because of the former requires much lower pressures and gives higher radiation yields. The pressures necessary for liquid phase reactions may be as high as 50 atmospheres or more and are usually at least 5 atmospheres. On the other hand, vapor phase reactions can be conveniently carried out at pressures of 1 to 3 atmospheres.

The charged reactor is exposed to ionizing radiation for a predetermined time which is sufficient to cause the desired level of oxidation. The reaction time is mainly dependent upon the temperature of the reactants and the dose rate. It may vary from a minute to several hours, depending upon the severity of the two aforementioned conditions. For instance, at intensities of $10^5$ to $10^6$ rads/hr. (1 rad=100 ergs. of radiation energy/gram of substance irradiated) and temperatures of 175 to 210° C. the exposure time should be between about 0.5 and 2 hours. At higher temperatures e.g. 230° C., and the same dosage, the reaction time should be substantially less, e.g. 1 to 5 minutes.

The liquid reaction products may be permitted to settle for a sufficient time to allow the aqueous and organic layers to separate. The epoxides and other oxidation products containing about the same number of carbon atoms as the feed are in the organic layer. The oxygenated organic products can be recovered from the liquid layers by fractional distillation or by solvent extraction. Because the radiation initiated partial oxidation of the hydrocarbon feed allows the utilization of moderately high temperatures instead of the higher temperatures generally needed for catalytic and noncatalytic partial oxidation, the selectivity of the process is unusually high insofar as epoxides and ethers are concerned. Under optimum conditions it is possible to obtain selectivities approaching the theoretical maximum selectivity for the particular feed. For example, with a $C_6$ hydrocarbon feed the liquid product consists almost entirely of $C_6$ epoxides and dimethyl tetrahydrofurans. It was noted that higher reaction temperatures favor the formation of ketones, such as acetone. While low molecular weight ketones are useful as solvents, it is preferable to employ the lower temperatures, i.e. below 200° C., which result in larger yields of the higher molecular weight epoxides and dimethyl tetrahydrofurans that can be catalytically isomerized to make high octane ketones.

The hydrocarbon feed may comprise any $C_5$ to $C_{15}$ stream which contains one or more hydrocarbons. For instance, the stream may contain olefins, paraffins, cycloparaffins or alkyl aromatics. In the case of alkyl aromatics, the alkyl side chain should contain at least 2 carbon atoms, e.g. ethyl, propyl, etc., and may contain up to 10 or more such atoms. Among the hydrocarbons which may be partially oxidized in accordance with the present invention are pentane, hexane, heptane, octane, nonane, dodecane, pentadecane, isooctane, isopentane, pentene-1, octene-1, nonene-1, dodecyl benzene, cyclopentene-1, cyclohexane, cyclohexene, cumene and hexane, methyl cyclohexane, cyclohexene, cumene and tetrahydronaphthalene. The carbon number range of the feed is preferably about $C_5$ to $C_{10}$ and it is especially preferred to use a $C_5$ to $C_7$ hydrocarbon stream.

The hydrocarbon feed may contain minor amounts of non-hydrocarbon substances as long as they do not significantly reduce the reaction rates. For instance, phenols and aromatic amines react with the radicals formed during the irradiation or chain propagation steps thereby preventing them from reacting with the other components in the reaction zone. This undesirable effect may be avoided either by taking care to eliminate them from the feed or employing sufficiently high dose rates to overcome their effect on the oxidation rate. It will be found that radiation intensities of the magnitude of $1\times10^4$ to $1\times10^9$ rads per hour will be sufficient. In most processes an intensity of about $1\times10^5$ to $1\times10^8$ rads per hour will be adequate to prepare epoxides, cyclic ethers and carbonyl compounds.

While the amount of molecular oxygen employed in the process may be more than the hydrocarbon feed on a molar basis, it is advisable to use an excess of hydrocarbon. It has been noted that the partial oxidation is best carried out with 1.5 to 3 moles of hydrocarbon per mole of oxygen. If desired, an inert gas such as nitrogen or helium may be introduced into the reaction zone together with the oxygen either as a diluent or a pressurizing agent.

Among the types of radiation that are suitable for the purposes of the invention are high energy electromagnetic radiation, such as gamma rays and X-rays, and high velocity electrons, as well as beta rays, alpha particles, and neutrons. These types of radiation can be supplied by naturally occurring radioactive materials or by common neutron sources. Fission by-products of processes generating atomic power or fissionable materials which emit high energy gamma rays afford a highly desirable and most abundant source of radioactivity suitable for the purposes of this invention.

Irradiation can also be obtained from nuclear reactors such as atomic piles. In this form of the invention wherein neutrons are used, it is preferred that the neutron flux in the radiation zone be above $10^8$ neutrons/cm.$^2$/second besides maintaining an appreciable gamma-ray dosage. Conventional moderators can, of course, be used, such as water, carbon, and hydrocarbons. In some cases the feed stream itself can serve as a moderator. Materials made radioactive by exposure to neutron irradiation, such as radioactive cobalt[60] which emits gamma rays, can likewise be used. Suitable sources of high velocity electrons are the beams of electron accelerators, such as the Van de Graaff electrostatic accelerator. In general, however, high velocity electrons, high energy gamma rays and neutrons are preferred for the purposes of this invention, mainly because of the high penetrating power of these rays and/or the availability and ease of application of these sources of energy. By high energy ionizing radiation is meant, the radiation from terrestrial sources of sufficient energy that the dose rate is at least $1\times10^4$ rads per hour. This excludes radiation such as cosmic and ultraviolet which are ineffectual for the purposes of this invention.

The invention will be more fully understood by referring to the following examples:

EXAMPLE 1

The partial oxidation of normal hexane (99% pure) was effected at about 177° C., which is below the cool flame region, by the use of nuclear radiation to initiate the chain reaction. It was found that the radiation efficiently initiated the chain reaction which was then propagated at the selected reaction temperature. Radiation yields of the order of 20,000 molecules of n-hexane reacting per 100 ev. were obtained. In each run relative proportions of 2 moles of 99% normal hexane and 1 mole of pure oxygen were introduced into a stainless steel bomb having a volume of 650 cc. and a surface to volume ratio of about 1 cm.$^{-1}$. Cobalt[60] gamma radiation sources of 2500 curies and 16,000 curies were employed. These correspond to intensity levels of about $10^5$ rad/hr. and $10^6$ rad/hr. The values of energy absorption were based on ferrous-ferric dosimetry and on methane radiolysis using as standard the G value of 5.7 molecules of hydrogen per 100 ev. at the reaction temperature. The dosimetry were considered reliable within ±15%. The reaction was carried out for 1 hour at 35 p.s.i.g. and thereafter the products were recovered from the reactor by distillation into cooled containers. The oxygenated products were separated either by extraction with phosphoric acid or by chromatographic adsorption and analyzed. The conditions and results are set forth in Table I:

Table 1

| Run No. | 1 | 2 | 3 |
|---|---|---|---|
| Radiation source | Co-60 | Co-60 | None |
| Radiation intensity, curies | 16,000 | 2,500 | 0 |
| Conversion, vol. percent on nC$_6$ feed | 15 | 6 | 0 |
| Oxygenated products, vol. percent on nC$_6$ feed | 14 | 6 | 0 |

Run No. 3, a control, shows that no oxygenated products were formed under the conditions of the experiment. On the other hand, runs No. 1 and No. 2 demonstrate that exposure to ionizing radiation strongly affects the partial oxidation of paraffins. For instance in run 1, 14 vol. percent of oxygenated products were recovered under conditions which otherwise do not result in the formation of such products. Thus, by employing the present radiolytic process, partial oxidation may be accomplished where no oxidation occurs in a purely thermal process.

EXAMPLE 2

Run 1 in Example 1 was repeated with the exception that the temperature of the reaction mixture during the oxidation was about 205° C. It was surprisingly found that whereas the oxygenated hydrocarbons in run 1 comprised a major proportion of $C_6$ epoxides, the major product at 205° C. (run 4) was acetone. A comparison of the composition of the oxygenated products is set forth in Table II:

Table II

| Run No. | 1 | 4 |
|---|---|---|
| Composition: | | |
| Methanol, weight percent | 5.3 | 2.2 |
| Acetone, weight percent | 9.2 | 44.4 |
| 2,5-dimethyltetrahydrofuran, weight percent | 8.8 | 13.3 |
| Other C$_6$ epoxides, weight percent | 76.7 | 40.1 |

Thus by regulating the temperature one can adjust the amount of a particular oxygenated compound in the reaction product. It is interesting to note that while epoxides are generally present in large amounts regardless of the temperature of the reaction, only negligible amounts of peroxides were formed.

EXAMPLE 3

Example 1 was substantially repeated at temperatures of 178° and 205° C. The radiation dose was varied to show the effect of the absorbed dose on hydrocarbon conversion.

Table III n-HEXANE CONVERSION AS A FUNCTION OF RADIATION DOSE AT $10^6$ RAD/HR. INTENSITY

| Radiation dose absorbed, megarads | n-Hexane conversion, percent at — | |
|---|---|---|
| | 178° C. | 205° C. |
| 0.5 | | 7.0 |
| 1.0 | 5.5 | 17.0 |
| 2.0 | | |
| 3.0 | 9.5 | 16.0 |
| 4.7 | 13.0 | 15.5 |

Table III summarizes the results of n-hexane conversion as a function of the absorbed dose at an intensity of $10^6$ rad/hr. It will be noted that the rate decreases with increasing dosages which is typical for static experiments and reflects the depletion of the reactants with time. In view of the large decrease of free energy for the oxidation reaction, it is extremely unlikely that the extent of the reaction is limited by equilibrium.

EXAMPLE 4

A number of radio-oxidations were carried out with n-hexane at various temperatures in the same reactor used in Example 1. The data are summarized in Table IV:

*Table IV*

BATCH RADIO-OXIDATIONS OF $nC_6$

| Feed: | | | | | |
|---|---|---|---|---|---|
| $nC_6$, gm | 3.06 | 3.25 | 3.76 | 3.25 | 3.06 |
| $O_2$, gm | 0.57 | 0.61 | 0.70 | 0.61 | 0.57 |
| Conditions: | | | | | |
| $nC_6/O_2$ mole ratio | 2 | 2 | 2 | 2 | 2 |
| Temperature, °C | 232 | 204 | 150 | 204 | 232 |
| Press., p.s.i.g | 35 | 35 | 35 | 35 | 35 |
| Co-60 intensity, rads/hr | $10^5$ | $10^5$ | $10^6$ | $10^6$ | $10^6$ |
| Contact time, hr | 1 | 1 | 1 | 1 | 1 |
| Recovery: | | | | | |
| Total liquid, gm | 1.88 | 3.30 | 3.67 | 3.29 | 1.92 |
| HC layer, gm | 1.38 | 2.90 | 3.67 | 2.84 | 1.77 |
| $H_2O$ layer, gm | 0.50 | 0.40 | Tr. | 0.45 | 0.15 |
| Material bal., weight percent.[1] | 62 | 101 | 98 | 101 | 63 |
| HC layer: | | | | | |
| $nC_6$ conv., vol. percent | 21.4 | 11.1 | 8.6 | 14.1 | 23.4 |
| Oxygenated prods., vol. percent | (²) | 8.0 | (²) | 14.0 | (²) |
| $H_2O$ layer: Percent carbon, weight percent | 6.4 | 22.6 | | 21.2 | (²) |
| Total $nC_6$ conv., weight [3] | 24.0 | 13.1 | 8.4 | 17.7 | 25.1 |
| G, molec. $nC_6$ reacted/100 ev | 16,800 | 14,600 | 950 | 1,990 | 1,780 |

[1] Calculated as gm. liquid recovered/gm. $nC_6$ fed. Does not include the gas make in the reaction, which could not be measured.
[2] Data not available.
[3] Calculated assuming that the carbon in the $H_2O$ layer is present as $CH_3CHO$. Corrected for material balance.

The foregoing examples show that hydrocarbon feeds can be partially oxidized at moderately high temperatures to make epoxides containing 3 and 4 member rings, hydrofurans, e.g. 2,5-dimethyltetrahydrofuran, ketones and alcohols, all of which are highly useful in the chemical field. Radiation permits the employment of conditions which are gentle enough to allow the recovery of these valuable intermediate products. However, the temperature range has a critical lower limit in that at reaction temperatures below 120° C. little or no conversion of the hydrocarbon feed is obtained. It is not known whether the oxidation reaction of the present invention is a free radical chain process initiated by radiation or an entirely new type of chain reaction propagated by ions.

What is claimed is:

1. Process for partially oxidizing $C_5$ to $C_{15}$ hydrocarbons which comprises contacting said hydrocarbons with molecular oxygen in the vapor phase and exposing the resulting mixture to high energy ionizing radiation at tempertaures of from above 120° to 230° C. for 1 minute to several hours and recovering oxygenated organic compounds comprising mainly epoxides, the intensity of said ionizing radiation being sufficient to provide a dose rate of at least $1 \times 10^4$ rad/hr.

2. Process for partially oxidizing normal $C_5$ to $C_{15}$ paraffin hydrocarbons which comprises contacting 0.5 to 5 moles of said hydrocarbon with 1 mole of oxygen in the vapor phase, exposing the resulting mixture to gamma radiation having an intensity of at least $1 \times 10^4$ rads/hr. for about 1 minute to several hours at 175° to 230° C. and under pressures up to 30 atmospheres, and recovering the oxygenated products formed by distillation, said oxygenated products comprising mainly epoxides.

3. Process according to claim 2 in which the hydrocarbons are $C_5$ to $C_{10}$ hydrocarbons.

4. Process according to claim 2 in which the temperature is below 200° C. and the oxygenated products comprise a major proportion of epoxides.

5. Process according to claim 2 in which the temperature is about 200° to 230° and the oxygenated products contain a substantial amount of ketone.

6. Process for partially oxidizing n-hexane which comprises contacting about 1.5 to 3 moles of hexane with 1 mole of oxygen in the vapor phase, exposing the resulting mixture to gamma radiation having an intensity of $1 \times 10^5$ to $1 \times 10^8$ rads/hr. for 30 minutes to 2 hours at 175° to 210° C. and pressures up to 3 atmospheres, separating the oxygenated products by distillation and recovering said oxygenated products which comprise a major proportion of $C_6$ epoxides.

References Cited in the file of this patent
UNITED STATES PATENTS

| 2,350,330 | Remy | June 6, 1944 |
| 2,845,388 | Black et al. | July 29, 1958 |
| 2,934,481 | Ruskin | Apr. 26, 1960 |

FOREIGN PATENTS

| 563,539 | Canada | Sept. 23, 1958 |

OTHER REFERENCES

Liebenthal et al.: Second United Nations International Conference on the Peaceful Uses of Atomic Energy, vol. 29 (September 1958), pages 107–111.

Drimus et al.: Second United Nations International Conference on the Peaceful Uses of Atomic Energy, vol. 29 (September 1958), pages 152–161.